(12) United States Patent
Zhao et al.

(10) Patent No.: US 8,127,170 B2
(45) Date of Patent: Feb. 28, 2012

(54) METHOD AND APPARATUS FOR AUDIO RECEIVER CLOCK SYNCHRONIZATION

(75) Inventors: Qingming Zhao, Shenzhen (CN); Songcun Chen, Shenzhen (CN); Hui Zhang, Shenzhen (CN)

(73) Assignee: CSR Technology Inc., San Jose, CA (US)

( * ) Notice: Subject to any disclaimer, the term of this patent is extended or adjusted under 35 U.S.C. 154(b) by 0 days.

(21) Appl. No.: 12/299,255

(22) PCT Filed: Jun. 13, 2008

(86) PCT No.: PCT/CN2008/001144
§ 371 (c)(1),
(2), (4) Date: Oct. 31, 2008

(87) PCT Pub. No.: WO2009/149586
PCT Pub. Date: Dec. 17, 2009

(65) Prior Publication Data
US 2011/0078482 A1 Mar. 31, 2011

(51) Int. Cl.
G06F 13/00 (2006.01)
H04B 13/02 (2006.01)
H04L 7/06 (2006.01)
(52) U.S. Cl. .................. 713/400; 375/225; 375/364
(58) Field of Classification Search .............. 713/400, 713/500, 600; 375/225, 364
See application file for complete search history.

(56) References Cited

U.S. PATENT DOCUMENTS

| 4,788,697 | A | * | 11/1988 | Bell et al. | 375/364 |
| 5,402,495 | A | | 3/1995 | Kim | |
| 5,692,166 | A | * | 11/1997 | Milhizer et al. | 713/400 |
| 5,790,615 | A | * | 8/1998 | Beale et al. | 375/376 |
| 5,969,631 | A | * | 10/1999 | Ammler et al. | 370/514 |
| 6,121,845 | A | | 9/2000 | Eribes | |
| 6,380,981 | B1 | | 4/2002 | Kasezawa et al. | |
| 6,763,274 | B1 | | 7/2004 | Gilbert | |
| 7,555,085 | B1 | * | 6/2009 | Risk et al. | 375/354 |
| 2001/0043621 | A1 | * | 11/2001 | Anderson et al. | 370/516 |
| 2004/0057547 | A1 | * | 3/2004 | Henrickson | 375/376 |
| 2005/0013396 | A1 | * | 1/2005 | Kliesner et al. | 375/372 |

FOREIGN PATENT DOCUMENTS

| CN | 1157511 | 8/1997 |
| CN | 1198831 | 11/1998 |

OTHER PUBLICATIONS

Written Opinion of the International Searching Authority, PCT/CN2008/001144, dated Mar. 5, 2009.

* cited by examiner

Primary Examiner — Thomas Lee
Assistant Examiner — Phil Nguyen
(74) Attorney, Agent, or Firm — RatnerPrestia

(57) ABSTRACT

An audio receiver's output clock is synchronized based on a number of input and output audio samples measured over a predetermined sample period. In one embodiment, a sample difference may be determined by subtracting the measured number of input audio samples from the measured number of output audio samples. This sample difference may then be compared to a predetermined threshold. In one embodiment, if the absolute value of the sample difference is less than the predetermined threshold, no adjustment to the output clock may be needed. When the absolute value of the sample difference is greater than the predetermined threshold, the output clock rate may be adjusted either upwards or downwards.

21 Claims, 3 Drawing Sheets

METHOD AND APPARATUS FOR AUDIO RECEIVER CLOCK SYNCHRONIZATION

CROSS REFERENCE TO RELATED APPLICATION

This application claims priority to International Application No. PCT/CN2008/001144 filed Jun. 13, 2008.

FIELD OF THE INVENTION

The present invention relates generally to clock signal synchronization, and more particularly to synchronizing an audio receiver's output clock to the input clock rate.

BACKGROUND OF THE INVENTION

Sony/Philips Digital Interconnect Format (generally referred to as S/PDIF herein) is a digital audio interface standard used in consumer digital audio equipment, AES is a digital audio interface more often found in professional-grade equipment. In essence, S/PDIF specifies a Data Link Layer protocol and choice of Physical Layer specifications for carrying digital audio signals between devices and stereo components. The S/PDIF format is more recently part of a larger set of standards IEC 60958 (often referred to as AES/EBU). Both S/PDIF and AES/EBU formats are a unidirectional serial interface in which the audio signal is encoded with an embedded clock so that only a single data wire is needed. There is no specification of data rate or resolution in SPDIF protocol. The data rate is determined by the equipment using SPDIF connectors from the SPDIF signal mutually accepted by the two pieces of audio hardware involved.

While in some cases the S/PDIF interface may be used to carry compressed digital audio, in other cases the S/PDIF may carry uncompressed digital audio from an audio source, such as a compact disc player, to a receiver. Compressed digital audio may include Dolby Digital, DTS surround sound, etc. The S/PDIF standard may be applied to either optical or coaxial S/PDIF connectors. Selection of one over the other rests mainly on the availability of appropriate connectors on the chosen equipment and the preference and convenience of the user.

As mentioned above, both clock information and data arrive via a serial interface for S/PDIF audio receivers. The S/PDIF audio receiver must attempt to synchronize to the transmitter. However, some S/PDIF audio receivers use independent clocks for input and output. In such cases, the input clock will synchronize to the S/PDIF signals, while the output clock will use a local clock source. This will tend to cause some difference between the input and output clock rate, which might lead the receiver to either overflow or underflow, thereby lowering audio performance.

In order to compensate for the above clock-related audio distortion, some prior art systems use a large internal buffer to smooth the clock difference out over a longer period of time. However, this approach is more costly given the large buffer that is required. Other prior art systems utilize a phase-locked loop (PLL) tuning circuit to adjust the output clock rate. Again, such systems are more costly and complex due to the additional PLL circuitry required. As such, there is a need for a method and apparatus for the synchronization of audio receiver clocks.

SUMMARY OF THE INVENTION

Disclosed and claimed herein are methods and apparatus for synchronizing the output clock in an audio receiver. In one embodiment, a method includes receiving a digital audio signal having an embedded clock, setting an output clock rate for the output clock to an initial value based on the embedded clock, and measuring a number of input audio samples and a number of output audio samples over a predetermined sample period. The method further includes determining a sample difference based on the number of input audio samples and the number of output audio samples, determining if an absolute value of the sample difference is greater than a predetermined threshold, and adjusting the output clock rate in response to the determined sample difference.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview of the Disclosure

Figure 1:
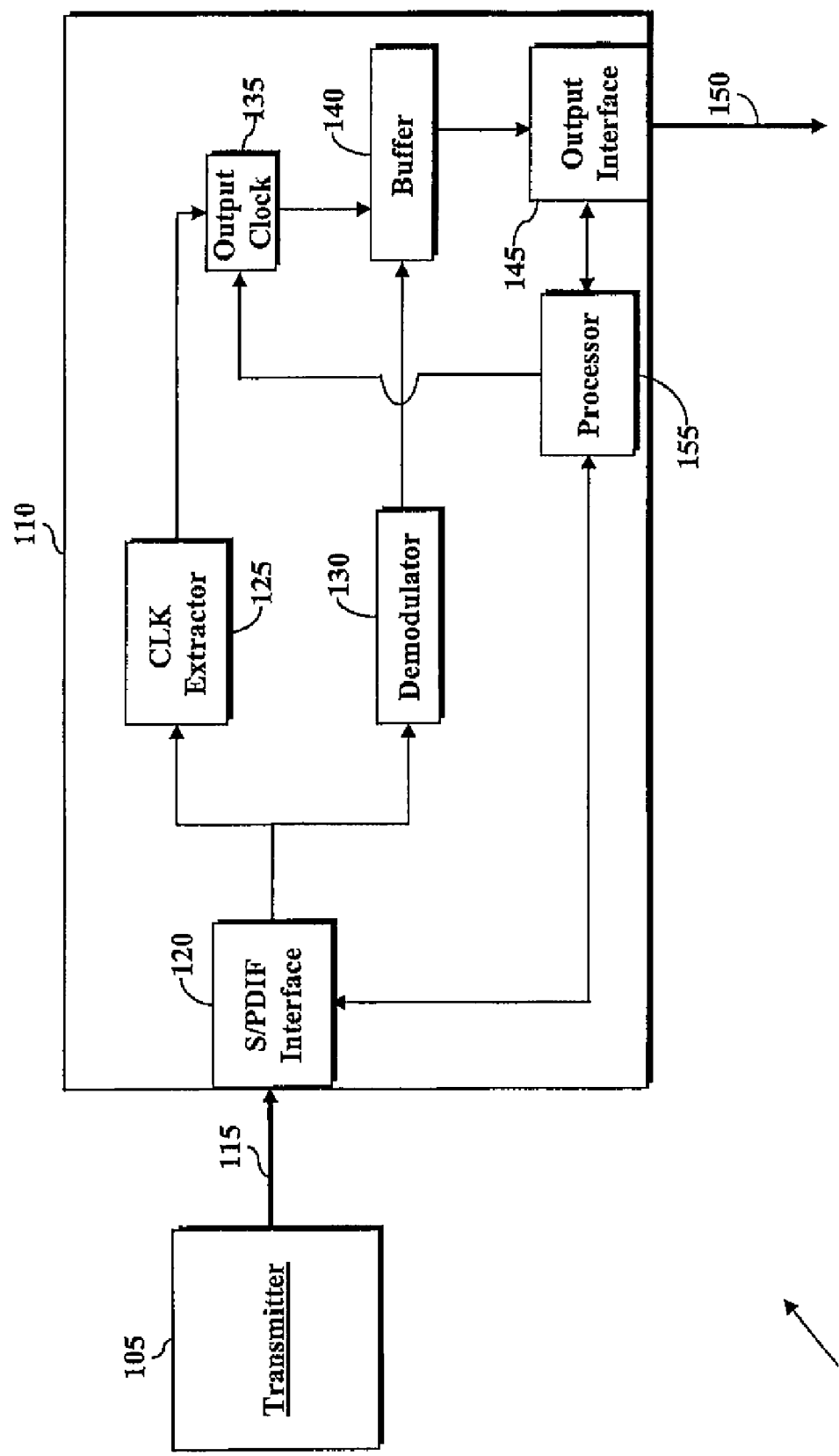
FIG. 1 illustrates a simplified block diagram of an S/PDIF audio receiver configured in accordance with an embodiment of the invention.

The present disclosure relates generally to the synchronization of an audio receiver's output clock. As will be described in more detail below, an initial output clock rate for the receiver's output clock may be set based on the digital audio signal's embedded clock. Thereafter, the number of input and output audio samples may be measured over a predetermined sample period. In one embodiment, this may be done by measuring or reading how many digitized audio samples pass through the audio receiver's input interface, as well as the audio receiver's output interface.

In one embodiment, a sample difference may be determined based on the aforementioned number of input and output audio samples that are measured. This sample difference may then be compared to a predetermined threshold. In one embodiment, if the absolute value of the sample difference is less than the predetermined threshold, no adjustment to the output clock may be needed. On the other hand, when the absolute value of the sample difference is greater than the predetermined threshold, the output clock rate may be adjusted either upwards or downwards in response. Additional details and features of the exemplary embodiments are described below.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a fiber optic medium, etc.

Overview of an Exemplary Online Environment

FIG. 1 illustrates a simplified block diagram for a system 100 comprising a digital transmitter 105 providing a digital audio signal 115 to an audio receiver 110. It should be appreciated that the term "audio receiver" is used in the context of home audio systems and may refer to a combination of a tuner, a pre-amplifier, and a power amplifier all on the same chassis. This configuration is also known as an "integrated receiver," while a chassis that implements only one of the three aforementioned components is a discrete audio component commonly referred to by its function (i.e., tuner, pre-amplifier or power amplifier). To that end, it should be appreciated that the audio receiver 100 of FIG. 1 may be an integrated receiver or any one of the aforementioned discrete audio components.

The digital transmitter 105 may be a Compact Disk (CD) player, a Digital Versatile Disk (DVD) player, a cable or satellite Set Top Box (STB), or other device which supports S/PDIF audio output. In the embodiment of FIG. 1, the digital audio signal 115 from the digital transmitter 105 may comply with the Sony/Phillips Digital Interface (S/PDIF) standard. However, in another embodiment, the digital audio signal 115 may comprise any audio data signal encoded with an embedded clock. The communication medium used for transmitting the digital audio signal 115 may be a coaxial cable, a fiber optic cable, etc.

The audio receiver 110 includes an S/PDIF interface 120 for receiving and recovering the modulated digital audio carrier signal 115 from the communication medium. In certain embodiments, a clocking or timing signal is included in the digital audio signal 115, such as would be the case with the S/PDIF standard. To that end, a clock extractor circuit 125 may be coupled to the input S/PDIF interface 120 and used to extract or otherwise determine the embedded clocking or timing signal. In one embodiment, the clock extractor 125 may be used to provide an initial clock rate to the receiver's output clock 135. In another embodiment, rather than providing the initial clock rate directly to the output clock 135, the processor 155 may read the clock extractor 125 to set or determine an initial clock rate for the output clock 135.

A demodulator 130 may also be coupled to the input S/PDIF interface 120 and configured to decode the data frames comprising the received digital audio signal 115. As is generally known in the field of audio decoding, the decoded data frames may be reformatted to generate digitized samples of the received digital audio signal 115. The recreated digitized samples may be converted using a digital-to-analog converter prior to being provided to the output interface 145 where the analog output signal 150 is desired. Alternatively, the recreated digitized samples may be provided directly to the output interface 145 where a digital output is desired. Additional details of demodulation are known in the art and beyond the scope of this disclosure.

Continuing to refer to FIG. 1, the audio receiver 110 further comprises a buffer 140 electrically coupled to the demodulator 130. In one embodiment, the digitized samples from the demodulator 130 may be provided to the buffer 140. In one embodiment, the buffer 140 need not be as large as prior art systems since the smoothing effect referred to above in the Background section is unnecessary when implementing the synchronization approach disclosed and claimed herein. By way of a non-limiting example, in one embodiment the buffer 140 may be no larger than 512 words.

In accordance with the output clock 135, which may be controlled by processor 155, the buffer 140 may provide the audio samples to an output interface 145 at the prescribed rate. The output interface 145, which may correspond to either analog or digital output (S/PDIF), may then produce output signal 150, which, as mentioned above, may be either analog or digital depending on what is desired and whether a digital-to-analog converter is used.

The processor 155 is further shown as being coupled to both the input S/PDIF interface 120 and the output interface 145. This may enable the processor 155 to read or otherwise determine the number of audio samples coming into the audio receiver 110 (e.g., determined at the input S/PDIF interface 120), and the number of audio samples going out of the audio receiver 110 (e.g., determined at the output interface 145). As will be described in more detail below with references to FIGS. 2-3, the processor 155 may use the information regarding the number of input and output samples to synchronize the output clock 135 to the clock signal embedded in the digital audio signal 115, thereby reducing signal distortion and improving performance.

Figure 2:
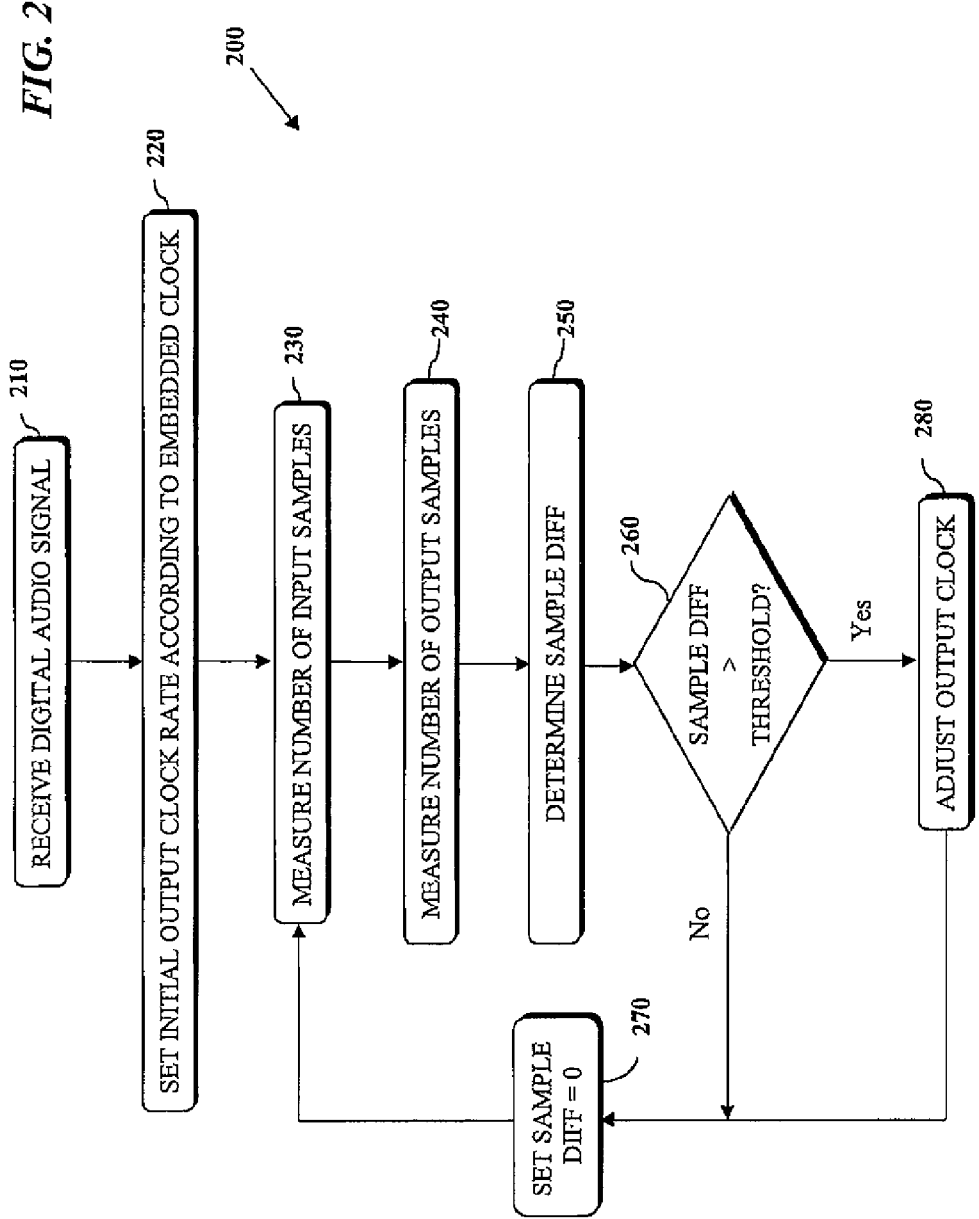
FIG. 2 illustrates a process for synchronizing an audio receiver's output clock, according to one or more embodiments of the invention.

Referring now to FIG. 2, depicted is a process 200 for synchronizing an audio receiver's output clock (e.g., output clock 135), according to one embodiment of the invention. In particular, process 200 begins at block 210 with the audio receiver (e.g., audio receiver 110) receiving a digital audio signal (e.g., signal 115). In certain embodiments, the digital audio signal has an embedded clock. Additionally, the digital audio signal may be received via a serial interface, such as input S/PDIF interface 120 of system 100.

Process 200 continues to block 220 where the initial output clock rate for the receiver's output clock is set to an initial or starting value. In one embodiment, this initial value is based on the digital audio signal's embedded clock. In certain embodiments, it may be necessary to extract the embedded clock (e.g., using clock extractor 125) prior to setting the output clock rate to the initial value. An S/PDIF data rate of 44.1 kHz is most common and found in stereo audio CDs. The other common data rate is the 48 kHz found in Digital Audio Tape (DAT).

Continuing to refer to FIG. 2, process 200 may then continue to block 230 where a number of input audio samples may be measured over a predetermined sample period. In one embodiment, this may be done by measuring or reading how many digitized audio samples are received by the audio receiver during the predetermined period of time. By way of providing a non-limiting example, in one embodiment the number of audio samples entering an input interface (e.g., output S/PDIF interface 120) of the audio receiver may be measured.

Process 200 further includes measuring a number of output audio samples over the predetermined sample period at block 240. Similar to block 230, this may involve measuring or reading how many digitized audio samples are output from the audio receiver during the predetermined period of time. In one embodiment, the number of audio samples exiting an output interface (e.g., output interface 145) of the audio receiver may be measured.

With respect to aforementioned blocks 230 and 240, in one embodiment the predetermined sample period may be between 20 and 40 milliseconds (ms).

Following the measurement of the number of input and output samples as described above, process 200 may then continue to block 250 where a sample difference may be determined based on the number of input audio samples and the number of output audio samples. In one embodiment, this determination may be made by subtracting the number of input audio samples (e.g., determined at block 230) from the number of output audio samples (e.g., determined at block 240). However, it should of course be appreciated that the inverse subtraction operation may similarly be performed to arrive at the sample difference.

The sample difference computed at block 250 may then be compared to a predetermined threshold at block 260. In one embodiment, if the absolute value of the sample difference is less than (or even equal to) a predetermined threshold, it may be assumed that no adjustment is needed and the sample difference may be reset to 0 at block 270, and the process 200 may revert back to block 230 for the next sample period. For predetermined sample period of between 20 and 40 ms, the predetermined threshold may be between 8 and 32. However, it should of course be appreciated that the predetermined threshold for sample difference may be higher or lower depending on design considerations for example.

If, on the other hand, the absolute value of the sample difference is greater than the predetermined threshold, process 200 may continue to block 280 where the output clock rate may be adjusted in response to the calculated sample difference. In one embodiment, the output clock rate may be adjusted either upwards or downwards based on the sign (i.e., positive or negative) of the sample difference and the means by which it was calculated. The amount of the adjustment may be predetermined, and fall in the range of between 1.0 and 2.0 Hz. In this fashion, the audio receiver's output signal (e.g., output signal 150) may be synchronized to the received digital signal (e.g., digital signal 115), thereby reducing or minimizing overflow or underflow without the need for additional hardware.

Figure 3:
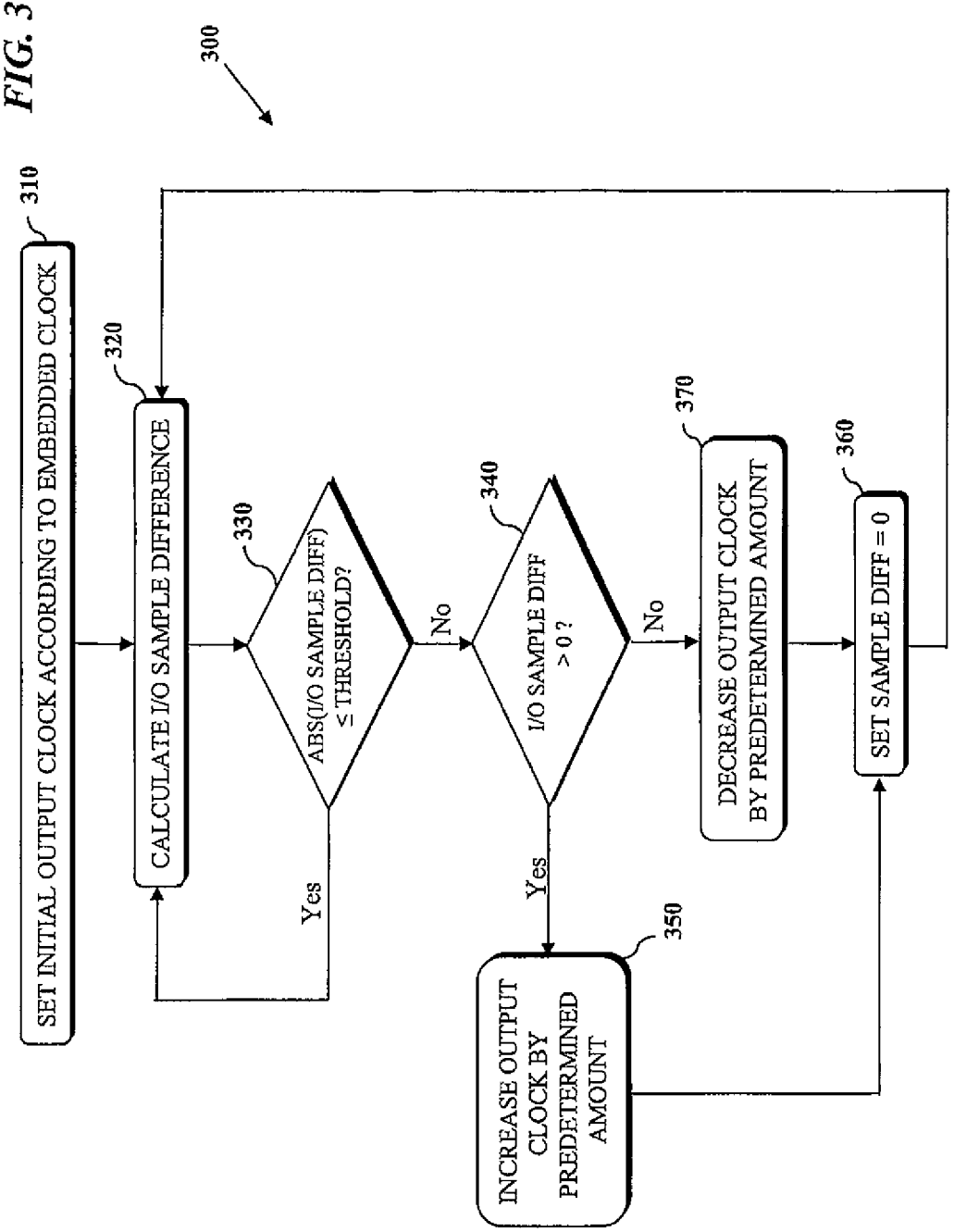
FIG. 3 illustrates another process for synchronizing an audio receiver's output clock, according to one or more embodiments of the invention.

Referring now to FIG. 3, depicted is another embodiment of a process 300 for synchronizing an audio receiver's output clock (e.g., output clock 135) to the embedded clock in a digital audio signal. Process 300 begins at block 310 where the initial output clock rate for the receiver's output clock may be set to an initial or starting value. In one embodiment, this initial value is based on the digital audio signal's embedded clock. As with the process 200 of FIG. 2, it may be necessary to extract the embedded clock (e.g., using clock extractor 125) prior to setting the output clock rate to the initial value. It should further be appreciated that the digital audio signal may be received via a serial interface, such as input S/PDIF interface 120 of system 100.

Process 300 may then continue to block 320 where the I/O sample difference may be computed. In one embodiment, the operation of block 320 may be similar to that of blocks 230-250 of FIG. 2 in which a number of input audio samples and output audio samples are measured over a predetermined sample period, and then compared. In certain embodiments, the predetermined sample period may be between 20 and 40 ms.

Following the calculation of the I/O sample difference, process 300 may then continue to decision block 330 where the absolute value of the I/O sample difference is compared to a predetermined threshold. In one embodiment, if the absolute value of the I/O sample difference is less than (or even equal to) the predetermined threshold, it may be assumed that no adjustment is needed and process 300 may revert back to block 320 for the next sample period. In certain embodiments, the predetermined threshold may be between 8 and 32.

If, on the other hand, the absolute value of the I/O sample difference is greater than the predetermined threshold, then process 300 may continue to decision block 340 where a second determination may be made as to whether the I/O sample difference is greater than 0. If so, process 300 continues to block 350 where the output clock rate may be increased by a predetermined amount in the range of between 1.0 and 2.0 Hz. Following the incremental adjustment made at block 350, process 300 may continue to block 360 where the I/O sample difference is reset and the process repeats for a subsequent sample period beginning at block 320.

If it is determined at block 340 that I/O sample difference is less than 0, process 300 may continue to block 370 where the output clock rate may instead be decreased by the predetermined amount. Thereafter, process 300 may reset the I/O sample difference (block 360) and return to block 320 for a subsequent sample period. As such, the audio receiver's output clock (and hence the output signal) may be dynamically synchronized to the received signal without the need for additional hardware.

With respect to the operations of block 340, it is assumed that the I/O sample difference is based on a subtraction of the number of input audio samples from the number of output audio samples. Hence, a positive I/O sample difference would indicate that more audio samples are entering the audio receiver than are leaving it and, hence, the rate at which the samples are output should be increased by increasing the output clock rate. Similarly, a negative I/O sample difference would indicate that fewer audio samples are entering the audio receiver than are leaving it and, hence, the rate at which the samples are output should be decreased. However, it should of course be appreciated that the inverse subtraction operation may similarly be performed to arrive at the I/O sample difference, in which case the operations of blocks 350 and 370, respectively, would be transposed. It should also be appreciated that numerous other mathematical operations may be performed to arrive at the I/O sample difference including, for example, averaging, weighted averaging, or other statistical and numerical indications that the audio receiver may be experiencing overflow or underflow.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for synchronizing an output clock in an audio receiver, the method comprising the acts of:
receiving a digital audio signal having an embedded clock;
setting an output clock rate for the output clock to an initial value based on the embedded clock;
measuring a number of input audio samples over a predetermined sample period;
measuring a number of output audio samples over the predetermined sample period;
determining a sample difference based on the number of input audio samples and the number of output audio samples;
determining if an absolute value of the sample difference is greater than a predetermined threshold; and
adjusting the output clock rate in response to the absolute value of the sample difference being greater than the predetermined threshold.

2. The method of claim 1, wherein the receiving the digital audio signal comprises receiving the digital audio signal via an S/PDIF interface.

3. The method of claim 1, further comprising extracting the embedded clock prior to said setting the output clock rate to the initial value.

4. The method of claim 1, wherein the measuring the number of input audio samples comprises determining how many digitized audio samples are received by the audio receiver during the predetermined sample period.

5. The method of claim 4, wherein the measuring the number of output audio samples comprises determining how many digitized audio samples are output by the audio receiver during the predetermined sample period.

6. The method of claim 1, wherein the predetermined sample period is between 20 and 40 milliseconds.

7. The method of claim 6, wherein the predetermined threshold is between 8 and 32.

8. The method of claim 1, wherein the determining the sample difference comprises subtracting the number of output audio samples from the number of input audio samples.

9. The method of claim 8, wherein the adjusting the output clock rate comprises:
increasing the output clock rate by a predetermined amount when the sample difference is a positive value greater than the predetermined threshold; and
decreasing the output clock rate by the predetermined amount when the sample difference is a negative value whose absolute value is greater than the predetermined threshold.

10. An audio receiver comprising:
an input interface configured to receive a digital audio signal having an embedded clock;
an output interface;
an output clock having an output clock rate; and
a processor electrically coupled to the output clock, the input interface and the output interface, wherein the processor is configured to:
set the output clock rate to an initial value based on the embedded clock,
measure a number of input audio samples entering the input interface over a predetermined sample period,
measure a number of output audio samples exiting the output interface over the predetermined sample period,
determine a sample difference based on the number of input audio samples and the number of output audio samples,
determine if an absolute value of the sample difference is greater than a predetermined threshold, and
adjust the output clock rate in response to the sample difference.

11. The audio receiver of claim 10, wherein the input interface comprises an S/PDIF interface.

12. The audio receiver of claim 10, wherein the processor is further configured to extract the embedded clock prior to said setting the output clock rate to the initial value.

13. The audio receiver of claim 10, wherein the predetermined sample period is between 20 and 40 milliseconds.

14. The audio receiver of claim 13, wherein the predetermined threshold is between 8 and 32.

15. The audio receiver of claim 10, wherein the processor is further configured to determine the sample difference by subtracting the number of output audio samples from the number of input audio samples.

16. The audio receiver of claim 15, wherein to adjust the output clock rate, the processor is further configured to:
increase the output clock rate by a predetermined amount when the sample difference is a positive value greater than the predetermined threshold, and
decrease the output clock rate by the predetermined amount when the sample difference is a negative value whose absolute value is greater than the predetermined threshold.

17. A computer program product comprising:
a computer readable medium having non-transitory computer executable program code instructions tangibly embodied therein, that when executed by a computer cause the computer to synchronize an output clock in an audio receiver, the instructions including:
computer executable program code to set an output clock rate for the output clock to an initial value based on an embedded clock in a received digital audio signal;
computer executable program code to calculate an I/O sample difference;
computer executable program code to determine if an absolute value of the I/O sample difference is greater than a predetermined threshold; and
computer executable program code to adjust the output clock rate in response to the I/O sample difference being greater than the predetermined threshold.

18. The computer program product of claim 17, wherein the computer readable medium further includes computer executable program code to extract the embedded clock prior to the computer executable code to set the output clock rate to the initial value.

19. The computer executable program code of claim 17, wherein the computer executable code to calculate the I/O sample difference includes:
computer executable code to measure a number of input audio samples over a predetermined sample period,
computer executable code to measure the number of output audio samples over the predetermined sample period, and
computer executable code to subtract the number of output audio samples from the number of input audio samples measured over the predetermined sample period.

20. The computer executable program code of claim 19, wherein the predetermined sample period is between 20 and 40 milliseconds.

21. The computer executable program code of claim 20, wherein the predetermined threshold is between 8 and 32.

* * * * *